US012644003B2

(12) United States Patent
Dos Santos Freire et al.

(10) Patent No.: US 12,644,003 B2
(45) Date of Patent: *Jun. 2, 2026

(54) SILICA-GRAPHENIC CARBON COMPOSITE PARTICLES AND ELASTOMERIC MATERIALS INCLUDING SUCH PARTICLES

(71) Applicant: Qemetica S.A., Warsaw (PL)

(72) Inventors: Lucas Dos Santos Freire, Pittsburgh, PA (US); Qi Ding, Allison Park, PA (US); Cynthia Kutchko, Pittsburgh, PA (US); Shuyang Pan, Princeton, NJ (US); Nathan J. Silvernail, Mars, PA (US)

(73) Assignee: Qemetica S.A., Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,553

(22) Filed: Sep. 1, 2023

(65) Prior Publication Data

US 2023/0416534 A1     Dec. 28, 2023

Related U.S. Application Data

(63) Continuation of application No. 16/988,755, filed on Aug. 10, 2020, now Pat. No. 11,781,020.

(60) Provisional application No. 62/887,856, filed on Aug. 16, 2019.

(51) Int. Cl.
| | |
|---|---|
| *C08K 3/36* | (2006.01) |
| *B01J 2/04* | (2006.01) |
| *B60C 1/00* | (2006.01) |
| *B60C 11/00* | (2006.01) |
| *C08K 3/04* | (2006.01) |
| *C08L 9/06* | (2006.01) |
| *C09C 1/00* | (2006.01) |

(52) U.S. Cl.
CPC .............. *C09C 1/0081* (2013.01); *B01J 2/04* (2013.01); *B60C 1/0016* (2013.01); *B60C 11/0008* (2013.01); *C08K 3/042* (2017.05); *C08K 3/36* (2013.01); *C08L 9/06* (2013.01); *B60C 2011/0025* (2013.01); *C01P 2004/03* (2013.01); *C01P 2004/61* (2013.01); *C08L 2205/03* (2013.01)

(58) Field of Classification Search
CPC ........... C09C 1/0081; C09C 1/30; C09C 1/44; C09C 1/46; C08K 3/36; C08K 9/042; C08K 2201/005; C08L 9/06; C08L 2205/03

USPC ......................................................... 524/495
See application file for complete search history.

(56) References Cited

U.S. PATENT DOCUMENTS

| | | | |
|---|---|---|---|
| 3,873,489 A | | 3/1975 | Thurn et al. |
| 6,486,363 B1 | | 11/2002 | Berg et al. |
| 7,658,901 B2 | | 2/2010 | Prud'Homme et al. |
| 8,486,364 B2 | | 7/2013 | Vanier et al. |
| 9,221,688 B2 | | 12/2015 | Hung et al. |
| 9,815,701 B1 | | 11/2017 | Awad et al. |
| 11,518,856 B2 * | | 12/2022 | Vautard ..................... C08L 9/00 |
| 11,781,020 B2 * | | 10/2023 | Dos Santos Freire .... C08L 9/06 524/495 |
| 2006/0225615 A1 | | 10/2006 | Raman et al. |
| 2013/0296479 A1 | | 11/2013 | Martin |
| 2014/0193575 A1 | | 7/2014 | Hosmane |

FOREIGN PATENT DOCUMENTS

| | | |
|---|---|---|
| CN | 102306757 A | 1/2012 |
| CN | 105504345 A | 4/2016 |
| CN | 109081961 A | 12/2018 |

OTHER PUBLICATIONS

Brunauer et al., "Adsorption of Gases in Multimolecular Layers", The Journal of the American Chemical Society, 1938, pp. 309-319, vol. 60, No. 2.
Dreyer et al., "The chemistry of graphene oxide", Chemical Society Reviews, 2010, pp. 228-240, vol. 39, No. 1.
Liu et al.,"Graphene-coated silica as a highly efficient sorbent for residual organophosphorus pesticides in water", J. of Matls Chemistry, 2013, pp. 1875-1884, vol. 1 Issue 5.
Mo et al., "Mesoporous silica coated graphene oxide: fabrication, characterization and effects on the dielectric properties of its organosilicon hybrid films", Journal of Materials Science: Materials in Electronics, 2019, pp. 130-146, vol. 30, No. 1.
Yang et al., "Graphene-coated materials using silica particles as a framework for highly efficient removal of aromatic pollutants in water", Scientific Reports, 2015.

* cited by examiner

*Primary Examiner* — Hannah J Pak
(74) *Attorney, Agent, or Firm* — DLA Piper LLP (US)

(57) ABSTRACT

Composite particles may be produced by drying slurries containing silica particles and graphenic carbon particles in a liquid carrier. Elastomeric formulations comprising a base elastomer composition and the silica-graphenic carbon composite particles are also disclosed. The formulations possess favorable properties such as increased stiffness and are useful for many applications such as tire treads.

19 Claims, 2 Drawing Sheets

SILICA-GRAPHENIC CARBON COMPOSITE PARTICLES AND ELASTOMERIC MATERIALS INCLUDING SUCH PARTICLES

CROSS REFERENCE TO RELATED APPLICATIONS

This application is a continuation of U.S. patent application Ser. No. 16/988,755, filed Aug. 10, 2020, and titled "SILICA-GRAPHENIC CARBON COMPOSITE PARTICLES AND ELASTOMERIC MATERIALS INCLUDING SUCH PARTICLES", which in turn claims the benefit of priority of U.S. Provisional Application No. 62/887,856, filed Aug. 16, 2019, and titled "SILICA-GRAPHENIC CARBON COMPOSITE PARTICLES AND ELASTOMERIC MATERIALS INCLUDING SUCH PARTICLES". All of these applications are incorporated by reference herein in their entireties.

FIELD OF THE INVENTION

The present invention relates to elastomeric materials including composite particles comprising silica and graphenic carbon dispersed therein.

BACKGROUND OF THE INVENTION

Various fillers have been added to elastomeric compositions. For example, carbon black has been utilized in various parts of tires including the tread to reinforce the rubber. In addition, silica has been utilized in tire treads to reinforce the rubber while improving rolling resistance. While it is desirable to add significant amounts of filler in order to improve certain performance characteristics of tire tread formulations, the large loadings also have detriments in performance parameters such as viscosity, elongation and hysteresis. It is of interest to reinforce the rubber and optimize mechanical properties without significantly affecting other properties in a negative way.

SUMMARY OF THE INVENTION

An aspect of the present invention provides silica-graphenic carbon composite particles.

Another aspect of the present invention provides a drying method for producing silica-graphenic carbon composite particles.

A further aspect of the invention provides reinforced elastomeric material comprising a base elastomer composition with silica-graphenic carbon composite particles dispersed therein.

Another aspect of the invention provides a method of making an elastomeric material comprising mixing dried silica-graphenic carbon composite particles with a base elastomer composition and curing the mixture.

DETAILED DESCRIPTION OF EMBODIMENTS OF THE INVENTION

Figure 1:
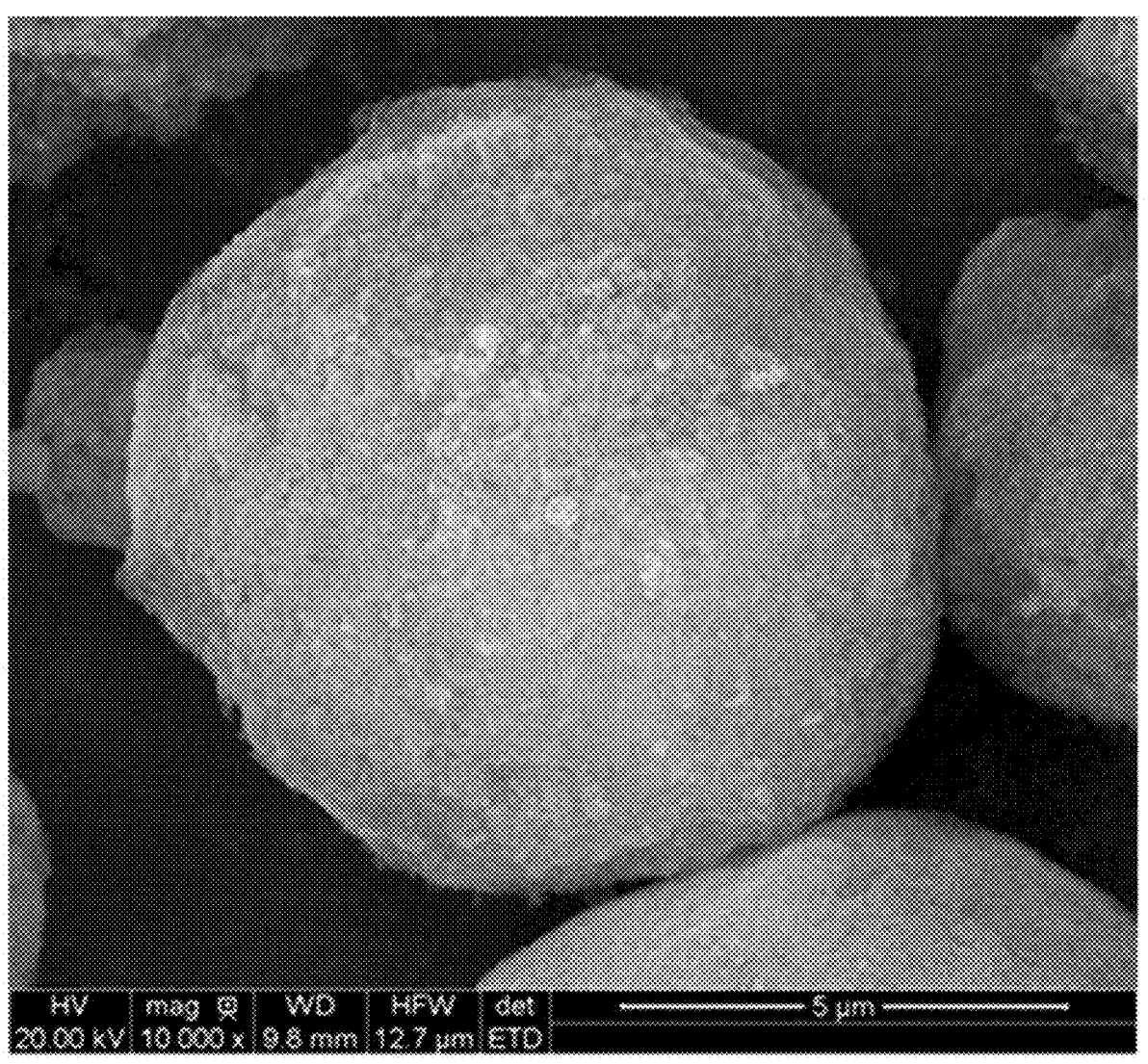
FIGS. 1 and 2 are SEM images of a silica-graphenic carbon composite particle at different magnifications.

For purposes of this detailed description, it is to be understood that the invention may assume various alternative variations and step sequences, except where expressly specified to the contrary. Moreover, unless otherwise indicated, all numbers expressing quantities used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The present invention provides silica-graphenic carbon composite particles. A slurry or suspension of starting particles of silica and graphenic carbon in a liquid carrier may be provided, which is dried to form a powder comprising silica-graphenic carbon composite particles. For example, each composite particle may comprise a combination of silica particles and graphenic carbon nanosheets in which the silica particles contact each other to form a continuous or interconnected network of silica particles, and the graphenic carbon nanosheets are distributed throughout the composite particle. Each composite particle may thus comprise multiple silica particles and multiple graphenic carbon nanosheets adhered or agglomerated to form the composite particle. In such agglomerated composite particles, the silica particles and graphenic carbon nanosheets may be uniformly distributed throughout each particle, or non-uniformly distributed. The surface of each composite particle typically comprises silica particles and may include graphenic carbon particles on a limited portion of the surface, rather than having a surface entirely of graphenic carbon particles. For example, the graphenic carbon particles may be provided in the form of graphene nanosheets that cover less than 50 percent of the surface area of each composite particle, for example, less than 25 percent, or less than 10 percent.

The silica-graphenic carbon composite particles may be combined with an elastomeric material to provide a continuous matrix of the elastomeric material with the composite particles dispersed therein. Such reinforced elastomeric materials may exhibit improved properties due to the dispersed silica-graphenic carbon composite particles, for example, improved mechanical properties including increased stiffness, elongation, combined elongation and hardness, abrasion resistance, wear resistance, tear strength, hysteresis and the like.

At least a portion of the silica-graphenic carbon composite particles may be comminuted to provide smaller particles before or during introduction into the elastomeric material, e.g., the dried composite particles may be broken up into smaller composite particles. Alternatively, the composite particles may be compacted, consolidated or otherwise combined into larger granules comprising multiple silica-graphenic carbon composite particles prior to introduction into the elastomeric material.

The silica-graphenic carbon composite particles may typically comprise from 60 to 99.9 weight percent silica and from 0.1 to 40 weight percent graphenic carbon particles, for example, from 70 to 99.8 weight percent silica and from 0.2 to 30 weight percent graphenic carbon particles, or from 75 to 99.7 weight percent silica and from 0.3 to 25 weight percent graphenic carbon particles, or from 80 to 99.6 weight percent silica and from 0.4 to 20 weight percent graphenic carbon particles.

The composite silica-graphenic carbon composite particles may typically have an average particle size of from 1 to 500 microns, for example, from 2 to 100 microns, or from 3 to 10 microns, as measured using Field Emission Scanning Electron Microscopy (FE-SEM).

The silica-graphenic carbon composite particles may have an average surface area of from 50 to 1,000 square meters per gram, for example, from 70 to 230 square meters per gram, or from 90 to 200 square meters per gram, or from 150 to 170 square meters per gram as measured by the standard CTAB method according to the ASTM D6845 test.

The silica-graphenic carbon composite particles may be present in the elastomeric materials in typical amounts of from 5 to 70 weight percent or from 10 to 60 weight percent or from 20 to 60 weight percent, for example, from 30 to 50 weight percent. It is desirable to control the amount of composite particles present in the formulation in order to improve traction and stiffness when the elastomeric material is used in tire treads, e.g., it may be desirable to add the composite particles in amounts greater than 5 or 10 weight percent, for example, greater than 20 or 30 weight percent.

The relative amounts of silica and graphenic carbon contained in the composite particles are controlled such that the amount of graphenic carbon may be optimized to an amount that provides desirable properties such as improvements in stiffness. For example, for improved stiffness properties of elastomeric materials, the amount of silica in the composite particles may be greater than 70 weight percent, or greater than 90 weight percent, while the amount of graphenic carbon particles may be less than 30 weight percent, such as less than 10 weight percent, such as less than 8 weight percent, or such as 6 weight percent, based upon the weight of the composite particles.

Such composite silica/graphenic carbon particles may be dispersed in an elastomeric composition. Elastomeric formulations in accordance with the present invention may be useful in various applications including tire components such as vehicle tire treads, subtreads, tire carcasses, tire sidewalls, tire belt wedge, tire beads, and tire wire skim coats, wires and cable jacketing, hoses, gaskets and seals, industrial and automotive drive-belts, engine mounts, V-belts, conveyor belts, roller coatings, shoe sole materials, packing rings, damping elements, and the like. While tire tread formulations are described herein as a particular embodiment of the invention, it is to be understood that the elastomeric formulations of the present invention are not limited to such uses and may be used in various other applications.

The elastomeric formulations of the present invention comprise a base elastomeric composition to which silica-graphenic carbon composite particles are added. The elastomeric formulations may comprise synthetic rubber, natural rubber, mixes thereof and the like. For example, the elastomeric composition may comprise styrene butadiene copolymer, polybutadiene, halobutyl and/or natural rubber (polyisoprenes). For use in tire treads, the base elastomeric composition typically comprises from 30 to 70 weight percent of the overall tire tread formulation, for example from 40 to 55 weight percent.

The elastomeric formulation may comprise a curable rubber. As used herein, the term "curable rubber" means both natural rubber and its various raw and reclaimed forms as well as various synthetic rubbers. For example, the curable rubber can include styrene/butadiene rubber (SBR), butadiene rubber (BR), butyl rubber, ethylene propylene diene monomer (EPDM) rubber, nitrile rubber, chloroprene rubber, silicone rubber, fluoroelastomer rubber, natural rubber, any other known type of organic rubber, and combinations thereof. As used herein, the terms "elastomer", "rubber" and "rubbery elastomer" can be used interchangeably, unless indicated otherwise. The terms "rubber composition", "compounded rubber" and "rubber compound" can be used interchangeably to refer to rubber which has been blended or mixed with various ingredients and materials, and such terms are well-known to those having skill in the rubber mixing or rubber compounding art.

As described more fully below, the composite silica and graphenic carbon particles may be produced from individual particles of silica and graphenic carbon that are mixed together in a liquid carrier and dried. The silica starting particles used to make the composite silica and graphenic carbon particles may include precipitated silica, colloidal silica, silica gel, and mixtures thereof. The starting silica particles can have an average particle size of less than 200 microns, or from 1 to 50 microns, or from 5 to 20 microns, as measured by electron microscope. The starting silica particles can have a typical surface area of from 25 to 1,000 or from 75 to 350 or from 80 to 250 square meters per gram. The surface area can be measured using conventional techniques known in the art. As used herein, the surface area is determined by the Brunauer, Emmett, and Teller (BET) method according to ASTM D1993-91. The BET surface area can be determined by fitting five relative-pressure points from a nitrogen sorption isotherm measurement made with a Micromeritics TriStar 3000™ instrument. A Flow-Prep-060™ station provides heat and a continuous gas flow to prepare samples for analysis. Prior to nitrogen sorption, the silica samples are dried by heating to a temperature of 160° C. in flowing nitrogen (P5 grade) for at least one (1) hour.

The silica particles for use in the present invention can be prepared using a variety of methods known to those having ordinary skill in the art, such as colloidal silica, precipitated silica, fumed silica, silica gels and the like. For example, the silica may be produced by the methods disclosed in U.S. patent application Ser. No. 11/103,123, which is incorporated herein by reference. For example, silica for use as untreated filler can be prepared by combining an aqueous solution of soluble metal silicate with acid to form a silica slurry. The silica slurry can be optionally aged, and acid or base can be added to the optional aged silica slurry. The silica slurry can be filtered, optionally washed, and optionally dried using conventional techniques known to a skilled artisan.

The silica may further comprise various surface treatments such as, but not limited to, those described in U.S. Pat. No. 3,873,489 at column 5 line 45 to column 6 line 56. Such surface treatments may be provided prior to, during, or after combination with the graphenic carbon particles. For example, such surface treatments may be provided on the dried silica-graphenic carbon composite particles.

The starting graphenic carbon particles used to produce the silica-graphenic carbon composite particles may have certain desirable characteristics. As used herein, the term "graphenic carbon particles" means carbon particles having structures comprising one or more layers of one-atom-thick planar sheets of $sp^2$ or $sp^3$ bonded carbon atoms.

In certain embodiments, the graphenic carbon particles may comprise graphite oxide, wherein the graphite oxide has a carbon to oxygen atomic ratio ranging from 2:1 to 25:1. Graphite oxide can be prepared, for example, by oxidation of graphite with potassium chlorate in a graphite and nitric acid mixture, or using other oxidizers.

In certain embodiments, the graphenic carbon particles may comprise graphene oxide (GO). GO is chemically similar to graphite oxide but instead of having a multi-layer structural arrangement, it comprises exfoliated monolayers of few-layered stacks. GO can be prepared by thermal exfoliation of graphite oxide as described in U.S. Pat. No. 7,658,901. The graphene oxide can also be prepared, for example, by dispersing in water, micro-mechanical exfoliation, chemical vapor deposition or chemical exfoliation of graphite oxide. Graphene oxide suitable for the present invention may have a thickness from 1 nm to 1,500 nm and average width ranging from 10 to 100 microns.

The graphene oxide used to produce the silica-graphenic carbon composite particles may be obtained from commercial sources, for example, graphene oxide powder or graphene oxide water suspension from Graphenea and other commercial sources. Such commercially available graphene oxide materials may be produced by known techniques in which layer(s) of graphite oxide are exfoliated to provide thin sheets.

In another embodiment, the graphenic carbon particles may consist of reduced graphene oxide (rGO). Reduced graphene oxide can be obtained by chemical reduction, thermal reduction, or UV light reduction of graphene oxide. Reduced graphene oxide resembles graphene but may contain residual oxygen and other heteroatoms, as well as structural defects.

The reduced graphene oxide used to produce the silica-graphenic carbon composite particles may be obtained from commercial sources, for example, reduced graphene oxide powder from Graphenea and other commercial sources.

For example, the synthesis of reduced rGO nanoparticles may be prepared as described in U.S. Pat. No. 9,815,701.

In certain embodiments, graphenic carbon particles include graphene, composed of structures comprising one or more layers of one-atom-thick planar sheets of $sp^2$ bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology. The graphenic carbon particles may be in the form of graphene nanosheets.

The graphenic carbon particles used to produce the silica-graphenic carbon composite particles of the present invention may have a thickness, measured in a direction perpendicular to the carbon atom layers, of no more than 10 nanometers, or no more than 5 nanometers, or no more than 4 or 3 or 2 or 1 nanometers, such as no more than 3.6 nanometers. The graphenic carbon particles may be from 1 atom layer up to 3, 6, 9, 12, 20 or 30 atom layers thick, or more. The graphenic carbon particles may have a width and length, measured in a direction parallel to the carbon atoms layers, of at least 20 nanometers, at least 50 nanometers, or at least 100 nanometers. The graphenic carbon particles may have a width and length of up to 200 nanometers or up to 500 nanometers. The graphenic carbon particles may have a width and length in the range of from 20 to 500 nanometers, such as 20 to 200 nanometers, such as 50 to 500 nanometers, such as 100 to 500 nanometers, or from 100 to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

The graphenic carbon particles used to produce the silica-graphenic carbon composite particles of the present invention have relatively low oxygen content. For example, the graphenic carbon particles may, even when having a thickness of no more than 5 or no more than 2 nanometers, have a carbon to oxygen atomic ratio greater than 25:1. The oxygen content of the graphenic carbon particles can be determined using X-ray Photoelectron Spectroscopy, such as is described in D. R. Dreyer et al., Chem. Soc. Rev. 39, 228-240 (2010).

The graphenic carbon particles may typically have a B.E.T. specific surface area of at least 50 square meters per gram, such as 70 to 1,000 square meters per gram, or, in some cases, 200 to 1,000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The graphenic carbon particles used to produce the silica-graphenic carbon composite particles of the present invention may have a Raman spectroscopy 2D/G peak ratio of at least 0.8:1, for example, at least 1.05:1, or at least 1.1:1, or at least 1.2:1 or at least 1.3:1. As used herein, the term "2D/G peak ratio" refers to the ratio of the intensity of the 2D peak at 2692 $cm^{-1}$ to the intensity of the G peak at 1,580 $cm^{-1}$.

The graphenic carbon particles may have a relatively low bulk density. For example, the graphenic carbon particles may be characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

The graphenic carbon particles may have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. The compressed density of the graphenic carbon particles may be 0.9 g/cm³ or less, such as less than 0.8 g/cm³, such as less than 0.7 g/cm³, such as from 0.6 to 0.7 g/cm³. The percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pounds of force in a 1.3-centimeter die for 45 minutes, wherein the contact pressure is 500 MPa. The compressed density of the graphenic carbon particles is then calculated from this measured thickness according to the following equation:

$$\text{Compressed Density } (\text{g/cm}^3) = \frac{0.1 \text{ grams}}{\Pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 g/cm³, which is the density of graphite.

The graphenic carbon particles may have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

The graphenic carbon particles used to produce the silica-graphenic carbon composite particles may be obtained from commercial sources, for example, exfoliated graphene from Angstron, XG Sciences and other commercial sources. Such commercially available graphene particles may be produced by known exfoliation techniques in which layer(s) of graphene are removed from graphite substrates to provide thin graphene sheets.

The graphenic carbon particles may be thermally produced in accordance with the methods and apparatus described in U.S. Pat. Nos. 8,486,363, 8,486,364 and 9,221,688, which are incorporated herein by reference. Such thermally produced graphenic carbon particles are commercially available from Raymor NanoIntegris under the designation PureWave.

The graphenic carbon starting particles can be made, for example, by thermal processes. The graphenic carbon particles may be produced from carbon-containing precursor materials that are heated to high temperatures in a thermal zone. For example, the graphenic carbon particles may be produced by the systems and methods disclosed in U.S. Pat. Nos. 8,486,363, 8,486,364 and 9,221,688, which are incorporated herein by reference.

The graphenic carbon particles may be made by using the apparatus and method described in U.S. Pat. No. 8,486,363, in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma); and (ii) the hydrocarbon is heated in the thermal zone to a temperature of at least 1,000° C. to form the graphenic carbon particles. The graphenic carbon particles may be made by using the apparatus and method described in U.S. Pat. No. 8,486,364, in which (i) a methane precursor material (such as a material comprising at least 50 percent methane, or, in some cases, gaseous or liquid methane of at least 95 or 99 percent purity or higher) is introduced into a thermal zone (such as a plasma); and (ii) the methane precursor is heated in the thermal zone to form the graphenic carbon particles. Such methods can produce graphenic carbon particles having at least some, in some cases all, of the characteristics described above.

During production of the graphenic carbon particles by the methods described above, a carbon-containing precursor is provided as a feed material that may be contacted with an inert carrier gas. The carbon-containing precursor material may be heated in a thermal zone, for example, by a plasma system. The precursor material may be heated to a temperature ranging from 1,000° C. to 20,000° C., such as 3,500° C. to 20,000° C., or 1,200° C. to 10,000° C. For example, the temperature of the thermal zone may range from 1,500° C. to 8,000° C., such as from 2,000° C. to 5,000° C. Although the thermal zone may be generated by a plasma system, it is to be understood that any other suitable heating system may be used to create the thermal zone, such as various types of furnaces including electrically heated tube furnaces and the like.

Without being bound by any theory, it is currently believed that the foregoing thermal methods of manufacturing graphenic carbon particles are particularly suitable for producing graphenic carbon particles having relatively low thickness and relatively high aspect ratio in combination with relatively low oxygen content, as described above. Moreover, such methods are currently believed to produce a substantial amount of graphenic carbon particles having a substantially curved, curled, creased or buckled morphology (referred to herein as a "3D" morphology), as opposed to producing predominantly particles having a substantially two-dimensional (or flat) morphology.

In accordance with certain aspects of the present invention, drying methods, such as spray drying, are used to produce the silica-graphenic carbon composite particles. The starting silica particles and graphenic carbon particles may be dispersed into liquid carriers to form slurries, followed by drying to produce the composite particles. For example, dry silica powders may be formed into slurries, followed by addition of the graphenic carbon particles, or dry silica powders may be added to a slurry comprising the graphenic carbon particles. Alternatively, the graphenic carbon particles may be combined with a silica slurry in situ, e.g., without first drying the silica.

The silica-graphenic carbon composite particles may be made by in situ techniques, e.g., in which the silica particles are formed in a slurry to which the graphenic carbon particles are added, the silica particles are precipitated in the presence of graphenic carbon particles and/or the graphenic carbon particles are added during or after precipitation of the silica. The combination of silica particles and graphenic carbon particles may be formed in situ and may be subjected to drying to produce the silica-graphenic carbon composite particles without prior drying of the silica particles.

Suitable liquid carriers for use in the slurries include water and/or organic solvents such as ethanol, methanol, acetone, chloroform, dimethyl formamide (DMF), dimethyl sulfoxide (DMSO), ethyl acetate, glycerin, methylene chloride, tetrahydrofuran (THF), and the like. The liquid carrier may be present in a typical amount of from 55 to 95 weight percent based on the total weight of the dispersion, for example, from 70 to 90 weight percent, or from 75 to 85 weight percent.

In addition to a liquid carrier, the dispersions may include a dispersing agent. Suitable dispersing agents include polymeric dispersants such as polyvinylpyrrolidone (PVP), acrylics, amines, epoxy and the like. Such dispersing agents may be present in the water or other solvent in a typical amount of from 0 to 50 weight percent based on the total weight of the solvent and dispersant, for example, from 1 to 30 weight percent, or from 2 to 20 weight percent.

Other additives may optionally be included in the dispersions, such as defoamers, surfactants, rheology modifiers and UV absorbers.

A typical dispersion may contain from 0.01 to 80 weight percent silica particles based on the total weight of the dispersion, for example, from 10 to 25 weight percent.

A typical dispersion may contain from 0.01 to 30 weight percent graphenic carbon particles based on the total weight of the dispersion, for example, from 0.1 to 10 weight percent.

The total combined amount of silica particles and graphenic carbon particles of such dispersions may typically comprise from 0.01 to 50 weight percent, for example, from 1 to 35 weight percent, or from 10 to 25 weight percent based on the total weight of the dispersion.

When a dispersant such as PVP is included in the dispersion, it may be present in a typical amount of from 0.1 to 10 weight percent based upon the total combined amount of dispersant, silica and graphenic carbon (excluding the solvent), for example, from 0.5 to 5 weight percent, or from 1 to 3 weight percent.

Separate dispersions of silica particles and graphenic carbon particles may be made, followed by combining the dispersions prior to drying. For example, the graphenic carbon particles may be dispersed in a water/polymeric dispersant liquid as described above, while the silica particles may be dispersed in water alone, or a combination of water and dispersant such as polyvinylpyrrolidone (PVP), acrylics, amine, epoxy or the like.

The composite particles may be dried using conventional drying techniques. Non-limiting examples of such techniques include oven drying, vacuum oven drying, rotary dryers, spray drying or spin flash drying. Non-limiting examples of spray dryers include rotary atomizers and nozzle spray dryers. Spray drying can be carried out using any suitable type of atomizer, in particular a turbine, nozzle, liquid-pressure or twin-fluid atomizer. The washed silica solids may not be in a condition that is suitable for spray drying. For example, the washed composite solids may be too thick to be spray dried. In one aspect of the above-described process, the washed composite solids, e.g., the washed filter cake, are mixed with water to form a liquid suspension and the pH of the suspension adjusted, if required, with dilute acid or dilute alkali, e.g., sodium hydroxide, to a pH value in the range from 6 to 7, e.g., 6.5, and then fed to the inlet nozzle of the spray dryer.

The temperature at which the composite particles are dried can vary widely but will be below the fusion temperature of the composite. Typically, the drying temperature will be above room temperature and may range from above 50° C. to less than 900° C., e.g., from above 100° C., e.g., 200° C., to 500° C. In one aspect of the above-described process, the composite solids are dried in a spray dryer having an inlet temperature of approximately 500° C. and an outlet temperature of approximately 105° C. The free water content of the dried composite can vary but may typically be in the range of from approximately 1 to 10 weight percent e.g., from 4 to 7 weight percent. As used herein, the term free water means water that can be removed from the composite by heating it for 24 hours at from 100° C. to 200° C., e.g., 105° C.

The pressure at which the composite particles can be dried can vary widely, for example, at atmospheric pressure, or under vacuum.

In one aspect of the process described herein, the dried composite is forwarded directly to a granulator where it is compacted and granulated to obtain a granular product. Dried composite can also be subjected to conventional size reduction techniques, e.g., as exemplified by grinding and pulverizing. Fluid energy milling using air or superheated steam as the working fluid can also be used. The precipitated composite obtained may usually be in the form of a powder. The composite product exiting the granulator can have a wide distribution of particle sizes, e.g., between −5 and +325 Mesh. If subjected to a size reduction operation, the composite product can be subjected to a sizing operation, e.g., separated into conforming and non-conforming size materials by means, for example, of vibrating screens with appropriate mesh sizes. Non-conforming product can be recycled to the size reduction or compaction processes. The sized composite product can be separated into a product having size range of between −18 and +230 Mesh, e.g., between −60 and +100 Mesh. Mesh sizes are in accordance with ASTM E11 ASD.

The elastomeric materials of the present invention may be made by combining the composite silica and graphenic carbon particles with emulsion and/or solution polymers as described above, e.g., organic rubber comprising solution styrene/butadiene (SBR), polybutadiene rubber or a mixture thereof, to form a master batch. Curable rubbers for use in the master batch can vary widely and are well known to the skilled artisan and can include vulcanizable and sulfur-curable rubbers. For example, curable rubbers can include those used for mechanical rubber goods and tires. A non-limiting example of a master batch can comprise a combination of organic rubber, water-immiscible solvent, treated filler and, optionally, processing oil. Such a product can be supplied by a rubber producer to a tire manufacturer. A benefit to a tire manufacturer using a master batch can be that the composite silica and graphenic carbon particles are substantially uniformly dispersed in the rubber, which can result in substantially reducing or minimizing the mixing time to produce the compounded rubber. In a non-limiting example, the master batch can contain from 10 to 150 parts of composite particles per 100 parts of rubber (phr).

The composite silica and graphenic carbon particles can be mixed with an uncured rubbery elastomer used to prepare the vulcanizable rubber composition by conventional means such as in a Banbury mixer or on a rubber mill at temperatures from 100° F. to 392° F. (38° C.-200° C.). Non-limiting examples of other conventional rubber additives present in the rubber composition can include conventional sulfur or peroxide cure systems. In alternate non-limiting examples, the sulfur-cure system can include from 0.5 to 5 parts sulfur, from 2 to 5 parts zinc oxide, and from 0.5 to 5 parts accelerator. In further alternate non-limiting examples, the peroxide-cure system can include from 1 to 4 parts of a peroxide such as dicumyl peroxide.

In addition to the silica-graphenic carbon composite particles in the amounts described above, the elastomeric formulations may also comprise fillers. Suitable additional fillers for use in the rubber formulations of the present invention can include a wide variety of materials known to one having ordinary skill in the art such as, for example, clays, talc, carbon black, and the like. Non-limiting examples can include inorganic oxides such as but not limited to inorganic particulate or amorphous solid materials which possess either oxygen (chemisorbed or covalently bonded) or hydroxyl (bound or free) at an exposed surface such as but not limited to oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in Advanced Inorganic Chemistry: A Comprehensive Text by F. Albert Cotton et al., Fourth Edition, John Wiley and Sons, 1980. Non-limiting examples of inorganic oxides for use in the present invention can include aluminum silicates, alumina, and mixtures thereof. Suitable metal silicates can include a wide variety of materials known in the art. Non-limiting examples can include but are not limited to alumina, lithium, sodium, potassium silicate, and mixtures thereof.

Non-limiting examples of conventional rubber additives can include processing oils, plasticizers, accelerators, retarders, antioxidants, curatives, metal oxides, heat stabilizers, light stabilizers, ozone stabilizers, organic acids, such as for example stearic acid, benzoic acid, or salicylic acid, other activators, extenders and coloring pigments. The compounding recipe selected will vary with the particular vulcanizate prepared. Such recipes are well known to those skilled in the rubber compounding art. In a non-limiting example, a benefit of the use of silica-graphenic carbon composite particles of the present invention when the coupling material is mercaptoorganometallic compound(s) can be the stability at elevated temperatures of a rubber compound containing such composite particles, and essentially the absence of curing of a rubber compounded therewith at temperatures up to at least 200° C. when mixed for at least one-half minute or up to 60 minutes.

In alternate non-limiting examples, the compounding process can be performed batch-wise or continuously. In a further non-limiting example, the rubber composition and at least a portion of the composite silica and graphenic carbon particles can be continuously fed into an initial portion of a mixing path to produce a blend and the blend can be continuously fed into a second portion of the mixing path.

The addition of silica-graphenic carbon composite particles to elastomeric materials in accordance with aspects of the present invention may produce improved mechanical properties such as stiffness, elongation, combined elongation and hardness, abrasion resistance, wear resistance and the like. For example, stiffness of the reinforced elastomeric materials may be increased in comparison to unreinforced elastomeric material or in comparison to an elastomeric material containing conventional particles such as silica particles dispersed therein, or to an elastomeric material containing silica particles dispersed therein and graphenic carbon particles dispersed in the elastomer, but added separately and not as part of the silica-graphenic carbon composite. For example, a silica-graphenic carbon composite particle-reinforced elastomeric material of the present invention may have a stiffness that is at least 5 percent or 10 percent or 20 percent greater than the same elastomeric material containing the same amount of silica particles having the same average particle size as the silica-graphenic carbon composite particles of the present invention.

The quality of silica dispersion and graphenic carbon dispersion in rubber may be determined using a piece of equipment called a DisperGrader (commercially available from Alpha Technologies). When examining rubber samples using this device, the amount of white area should be at a minimum. The dispersion of composite silica and graphenic particles may be important for consistent performance, wear, obtaining good reinforcement, and for limiting failures such as crack propagation. Thus, fillers that significantly reduce composite particle dispersion may not be acceptable.

Silica-graphenic carbon composite particles, a method of making silica-graphenic carbon composite particles, an elastomeric formulation, and a method of making an elastomeric formulation may be characterized by one or more of the following aspects.

In a first aspect, the present invention may relate to silica-graphenic carbon composite particles comprising from 60 to 99.9 weight percent silica, and from 0.1 to 40 weight percent graphenic carbon.

In a second aspect, the silica-graphenic carbon composite particles in accordance with the first aspect have an average particle size of from 1 to 500 microns, such as from 2 to 100 microns, or from 3 to 10 microns, as determined using FE-SEM.

In a third aspect, the graphenic carbon in accordance with the first aspect or the second aspect is in the form of graphene nanosheets.

In a fourth aspect, the graphene nanosheets in accordance with the third aspect have an average thickness of less than 10 nanometers.

In a fifth aspect, the graphene nanosheets in accordance with the third aspect or fourth aspect have average widths and lengths of from 20 to 200 nanometers.

In a sixth aspect, the graphenic carbon in accordance with the first aspect or the second aspect is selected from graphite oxide, graphene oxide, rGO, and combinations thereof.

In a seventh aspect, the graphenic carbon in accordance with any one of the first to sixth aspects is dispersed throughout each composite particle.

In an eighth aspect, the silica in accordance with any one of the first to seventh aspects comprises a continuous or interconnected network in which the graphenic carbon is dispersed.

In a ninth aspect, the surface of each composite particle in accordance with any one of the first to eighth aspects comprises the silica.

In a tenth aspect, a portion of the surface of each composite particle in accordance with any one of the first to ninth aspects comprises the graphenic carbon.

In an eleventh aspect, less than 50 percent, such as less than 25 percent, or less than 10 percent of the surface area of each composite particle in accordance with any one of the first to tenth aspects comprises the graphenic carbon.

In a twelfth aspect, the silica-graphenic carbon composite particles in accordance with any one of the first to eleventh aspects comprise from 70 to 99.8 weight percent silica and from 0.2 to 30 weight percent graphenic carbon, or from 75 to 99.7 weight percent silica and from 0.3 to 25 weight percent graphenic carbon, or from 80 to 99.6 weight percent silica and from 0.4 to 20 weight percent graphenic carbon.

In a thirteenth aspect, the present invention may relate to a method of making silica-graphenic carbon composite particles, the method comprising drying a slurry comprising silica particles, graphenic carbon particles, and a liquid carrier to thereby produce the silica-graphenic carbon composite particles, such as the silica-graphenic carbon composite particles of any one of the first through twelfth aspects.

In a fourteenth aspect, the drying according to the thirteenth aspect comprises spray drying.

In a fifteenth aspect, the liquid carrier according to the thirteenth aspect or fourteenth aspect comprises water.

In a sixteenth aspect, the slurry according to any one of the thirteenth to fifteenth aspects comprises a dispersing agent.

In a seventeenth aspect, the slurry according to any one of the thirteenth to sixteenth aspects is prepared by making separate dispersions of silica particles and graphenic particles, followed by combining the dispersions prior to drying.

In an eighteenth aspect, the slurry according to any one of the thirteenth to sixteenth aspects is prepared by forming dry silica powders into slurries, followed by addition of the graphenic carbon particles, or by adding dry silica to a slurry comprising the graphenic carbon particles.

In a nineteenth aspect, the present invention may relate to an elastomeric formulation comprising a base elastomer composition and from 5 to 70 weight percent silica-graphenic carbon composite particles.

In a twentieth aspect, the elastomeric formulation in accordance with the nineteenth aspect comprises natural rubber, synthetic rubber, or combinations thereof.

In a twenty-first aspect, the elastomeric formulation in accordance with the nineteenth aspect or the twentieth aspect comprises styrene/butadiene rubber, butadiene rubber, butyl rubber, EPDM rubber, nitrile rubber, chloroprene rubber, silicone rubber, fluoroelastomer rubber, natural rubber and/or functionalized derivatives thereof.

In a twenty-second aspect, the elastomeric formulation in accordance with any one of the nineteenth to twenty-first aspects comprises a tire tread formulation.

In a twenty-third aspect, the elastomeric formulation in accordance with any one of the nineteenth to twenty-second aspects comprises at least one additive selected from processing oils, antioxidants, curatives, and metal oxides.

In a twenty-fourth aspect, the silica-graphenic carbon composite particles in accordance with any one of the nineteenth to twenty-third aspects comprise from 30 to 50 weight percent of the formulation.

In a twenty-fifth aspect, the elastomeric formulation in accordance with any one of the nineteenth to twenty-fourth aspects comprises from 10 to 150 parts of composite particles per 100 parts of rubber.

In a twenty-sixth aspect, the present invention may relate to a method of making an elastomeric formulation comprising mixing silica-graphenic carbon composite particles with a base elastomer composition and curing the mixture.

In a twenty-seventh aspect, the base elastomer composition in accordance with the method of the twenty-sixth aspect comprises an organic rubber.

In a twenty-eighth aspect, the mixing step of the method in accordance with the twenty-sixth aspect or the twenty-seventh aspect further comprises mixing the composite particles and the base elastomer composition with a water-immiscible solvent, a filler, and, optionally, a processing oil.

In a twenty-ninth aspect, the mixing step of the method in accordance with any one of the twenty-sixth to twenty-eighth aspects further comprises mixing the composite particles and the base elastomer composition with a curative.

In a thirtieth aspect, the mixing step of the method in accordance with any one of the twenty-sixth to twenty-ninth aspects is performed batch-wise or continuously.

In a thirty-first aspect, the mixing step of the method in accordance with any one of the twenty-sixth to thirtieth aspects is performed by continuously feeding the base elastomer composition and at least a portion of the composite particles into an initial portion of a mixing path to produce a blend, and then continuously feeding the blend into a second portion of the mixing path.

The following examples are intended to illustrate certain aspects of the present invention and are not intended to limit the scope of the invention.

EXAMPLE 1

A waterborne graphene dispersion was prepared with the components listed in Table 1.

TABLE 1

| Component | Wt. % |
|---|---|
| Deionized Water | 89.3 |
| Polyvinylpyrrolidone (PVP10)[1] | 2.7 |
| Pure Wave ™ Graphene Nanoplatelets[2] | 8 |

[1]From Sigma Aldrich with a reported average molecular weight 10,000 g/mol.

[2]Commercially Available from Raymor NanoIntegris

The PVP was added to the water while mixing with a Cowles blade until fully dissolved. The Graphene Nanoplatelets material was gradually added while aggressively stirring with a Cowles blade, starting at 500 RPM and steadily increasing up to 2000 RPM as needed to form a pre-dispersed material, which was then milled using an Eiger mill with ceramic micro milling beads 1-1.2 mm in size to a residence time of 20 minutes to decrease the particle size to less than 1 m.

EXAMPLE 2

A silica dispersion was prepared with the components listed in Table 2.

TABLE 2

| Waterborne Hi-Sil EZ160 Silica Solution | |
|---|---|
| Component | Wt. % |
| DI Water | 84 |
| Hi-Sil ™ EZ160[3] | 16 |

[3]Precipitated silica commercially available from PPG Industries.

Approximately 1.5 kg of powdered silica was charged to a five-gallon bucket and 7.9 kg of water was added to reach the 16% solids content as given in Table 2. The silica and water mixture were then sheared for 5 minutes at approximately 8,000 RPM using a Premier Mill 2500 HV laboratory disperser fitted with a 3-inch diameter Norstone type 7HHS polyethylene Polyblade with three scoops and three teeth and a 2.0 horsepower motor. The solution was then again stirred with a high lift blade for one hour immediately before using.

EXAMPLE 3

Mixed dispersions containing differing amounts of graphene were made according to Table 3.

TABLE 3

Combined Waterborne Silica and Graphene Dispersions

| Components | Sample A | Sample B | Sample C |
|---|---|---|---|
| Graphene dispersion of Example 1 | 50 g | 25 g | 10 g |
| Silica dispersion of Example 2 | 175 g | 190 g | 195 g |
| DI water | 175 g | 190 g | 195 g |
| % graphene (vs. total graphene/silica) | 12.5% | 6.25% | 2.5% |

The graphene dispersion of Example 1 was added to the silica dispersion of Example 2 at three different graphene to silica ratios. The filler percentage of graphene reported in Table 3 is relative to the total filler, graphene and silica.

The dispersions of Samples A, B, and C were evaluated with a Mastersizer 2000 particle size analyzer, purchased from Malvern Panalytical Ltd. The individual particle sizes of the graphene and silica are reported below in Table 4.

TABLE 4

Particle Sizes of graphene and silica in dispersion

| Sample | Mastersizer - Graphene (μm) | Mastersizer - Silica (μm) |
|---|---|---|
| A | 38.14 | 37.17 |
| B | 22.99 | 20.69 |
| C | 40.71 | 39.60 |

EXAMPLE 4

Figure 2:
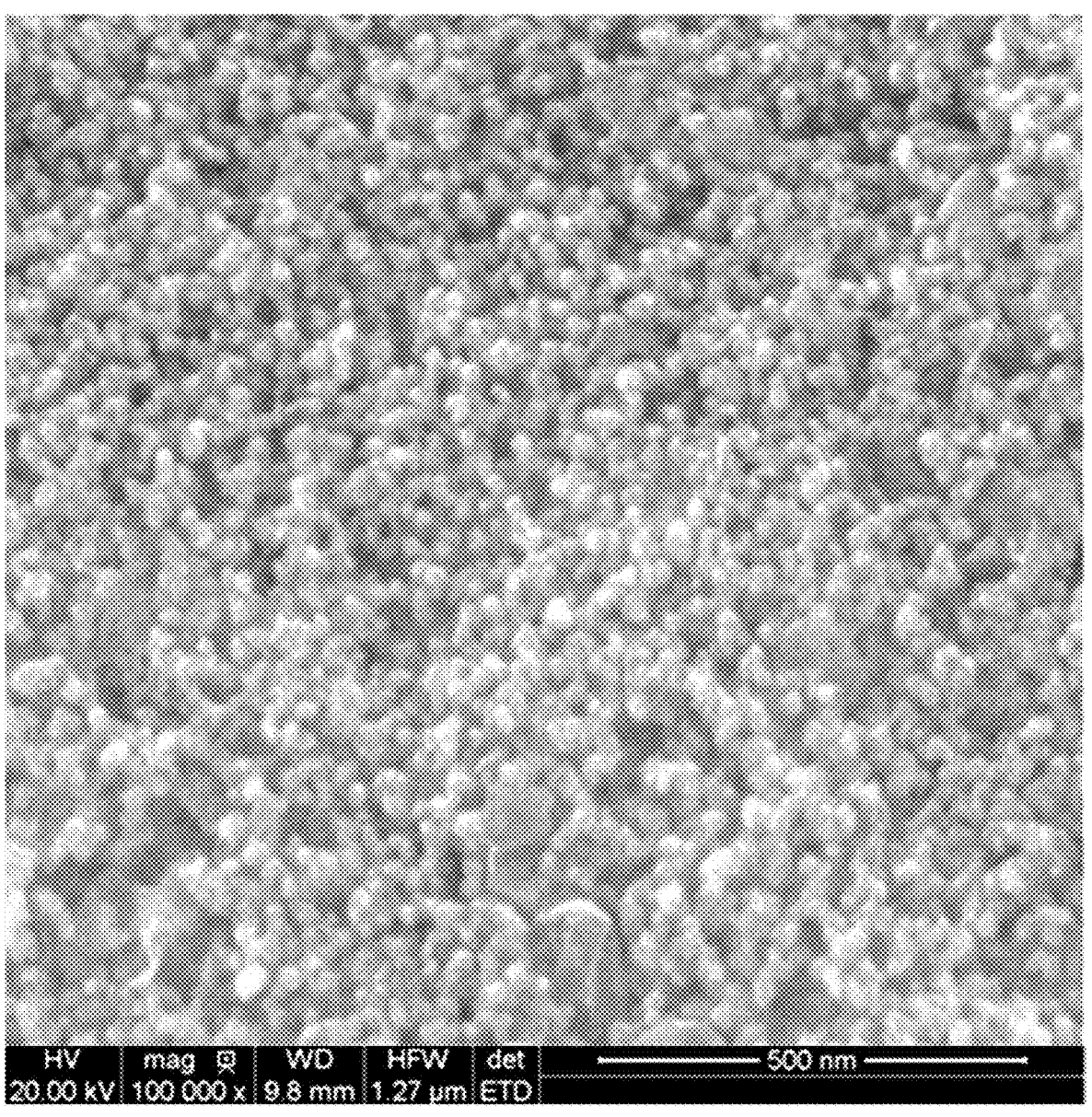

Sample A, Sample B, and Sample C from Table 3 were spray dried using a Buchi Spray Dryer, commercially available from Buchi Corporation with a 0.5 mm nozzle. Table 5 shows the conditions used to prepare the spray dried Samples D, E and F. SLPH means standard liter per hour. FIG. 1 is an SEM micrograph of a silicon-graphenic carbon composite particle produced by spray drying of Sample E at 10,000× magnification. FIG. 2 is an SEM micrograph of the same composite particle at 100,000× magnification. Non-spherical graphene platelets are visible at the magnification of FIG. 2.

TABLE 5

Spray Dry Parameters with 0.5 mm Nozzle

| Sample | Dispersion | Atomizer Flow (SLPH) | Aspirator % | Inlet Temperature (° C.) | Outlet Temperature (° C.) | Nozzle Cleaner (on/off) | Nozzle Cooling (on/off) |
|---|---|---|---|---|---|---|---|
| D | Sample A | 600 | 60 | 220 | 90 | On | On |
| E | Sample B | 600 | 60 | 220 | 90 | On | On |
| F | Sample C | 600 | 60 | 220 | 90 | On | On |

The particle sizes of the spray dried composite materials were measured using FE-SEM micrographs. Three images were captured at the same magnification in three different areas on the sample. The diameter of 10 particles in each area were measured at random for a total of 30 measured particles. The measurements were then averaged to obtain an average particle size and range of composite particle sizes. The particle size distribution of the composite particles is listed in Table 6.

TABLE 6

Particle Sizes of composite particles

| Sample | Spray Dried Composite Particle Size (μm) |
|---|---|
| D | 5.25 +/− 2 |
| E | 5.25 +/− 2 |
| F | 4.42 +/− 1 |

EXAMPLE 5

A waterborne silica and graphene oxide dispersion was prepared with the components listed in Table 7.

TABLE 7

Waterborne Hi-Sil EZ160 Silica - Graphene Oxide Solution

| Components | Sample G |
|---|---|
| Graphene Oxide 2.5% dispersion[1] | 400 g |
| Hi-Sil ™ EZ160[2] | 150 g |
| DI water | 600 g |
| % graphene oxide (vs. total graphene oxide/silica) | 6.25% |

[1]Commercially available from Graphenea, Inc.
[2]Precipitated silica commercially available from PPG Industries.

The Graphene Oxide was purchased from Graphenea Inc. as a 2.5 wt % dispersion of graphene oxide in water. The graphene oxide dispersion was further diluted with the amount of DI water indicated in Table 7. The dispersion was placed in a 2-liter beaker and stirred with an overhead stirrer fitted with a polyethylene blade. Slowly, 150 g of silica from Table 7 was added to the mixture. A homogeneous dispersion with the composition of Table 7 was obtained. Because the 400 g of graphene oxide from Graphenea, Inc. contains 2.5% of graphene oxide, the total amount of graphene oxide in the dispersion is 10 g. Since 150 g of silica were added, the resulting graphene oxide concentration in the silica-graphene oxide composite would be 6.25 wt %. The final dispersion was dried according to Example 4 with the conditions listed in Table 5 to obtain a dried composite.

EXAMPLE 6

A rubber compound was prepared using the model passenger tread formulation listed in Table 8. For this example, the silica filler traditionally used in rubber compounds was replaced by the silica-graphene composite of the invention. The silica-graphene composite used in this example consists of Sample E from Table 5. Since Sample E has a 6.25% of graphene, it can also be said that the 80 parts of composite filler in the compound is composed of 75 parts of silica and 5 parts of graphene.

TABLE 8

| Example 6 Rubber Formulation | | |
|---|---|---|
| | Component | Parts (phr) |
| Charge 1 | JSR HPR 350R[4] | 75 |
| | Budene ® 1207[5] | 25 |
| Charge 2 | Composite Sample E | 80 |
| | Vivatec ® 500 US[6] | 28.33 |
| | Si 266 ®[7] | 6.4 |
| | ZnO | 2.5 |
| | Stearic acid | 2.0 |
| | Santoflex ® 13[8] | 1.5 |
| Charge 3 | RM Sulfur[9] | 1.8 |
| | CBS[10] | 1.7 |
| | DPG[11] | 2.0 |
| | Total phr: | 226.23 |

[4]Solution styrene-butadiene rubber (SSBR); vinyl content: 58%, styrene content: 27%, Mooney viscosity (ML(1 + 4)100° C.): 65; obtained commercially from JSR.
[5]Butadiene rubber (BR); cis 1,4 content 97%, Mooney viscosity (ML(1 + 4)100° C.): 55; obtained commercially from The Goodyear Tire & Rubber Co.
[6]A processing oil obtained commercially from Hansen & Rosental.
[7]3,3'-bis(triethoxy-silylpropyl)disulfide obtained commercially from Momentive.
[8]N-(1,3-dimethylbutyl)-N'-phenyl-p-phenylenediamine antiozonant, obtained commercially from Flexsys.
[9]Rubber Makers (RM) Sulfur, 100% active, obtained commercially from Taber, Inc.
[10]N-cyclohexyl-2-benzothiazolesulfenamide obtained commercially from Flexsys.
[11]Diphenylguanidine, obtained commercially from Monsanto.

The compound was mixed in a C. W. Brabender® Intelli-Torque Plasti-Corder Torque Rheometer equipped with a 350 mL mixer head fitted with Banbury blades and using a fill factor of 75%.

The formulation was mixed using two non-productive passes, allowing the compound to cool between passes, followed by a productive pass where the curatives were added. For the first pass, the mixer rotors speed was set to 60 RMP and the components of Charge 1 were added to the mixer during the first 60 seconds of mixing. After 60 seconds into the mix cycle, the components of Charge 2 were added in the mixer. The first pass was dropped at four minutes from the starting of the mixing, at which point the mixing temperature had reached about 160° C.

For the second pass, the mixer rotors speed was kept at 60 RPM, and the cooled first pass Masterbatch was added during the first minute of mixing, slowly to avoid stalling the mixer. The second pass was dropped at four minutes when a drop temperature of about 160° C. was reached.

For the final pass, the mixer speed was kept at 40 RPM, and the cooled second pass Masterbatch was added during the first minute of mixing, slowly to avoid stalling the mixer. After adding the Masterbatch, Charge 3 was added. The second pass was dropped at three minutes when a drop temperature of about 100° C. had been reached.

The resulting rubber composition was cured at 150° C. for a time sufficient to reach 90% of the maximum torque obtained using the oscillating Disk Rheometer (90% ODR) plus 5 minutes ($T_{90}$+5 minutes).

EXAMPLE 7

A silica and graphene-oxide-containing rubber compound was prepared according to the procedure of Example 6, but replacing the composite Sample E with composite Sample G. Since Sample G has a 6.25% of graphene oxide, it can also be said that the 80 parts of composite filler in the compound is composed of 75 parts of silica and 5 parts of graphene oxide. Comparative Example 1 (CE-1)

A silica and graphene-containing rubber compound was prepared according to the procedure of Example 6 but replacing the composite Sample E with 75 parts free Hi-Sil EZ 160G and 5 parts free PureWave™ Graphene Nanoplatelets (predispersed in the Vivatec® 500 us, for purposes of safe handling).

COMPARATIVE EXAMPLE 2 (CE-2)

A rubber compound was prepared according to the procedure of Example 6 but replacing the composite Sample E with 80 parts free Hi-Sil EZ 160G. No graphene was added, resulting in a graphene-free rubber representing a standard silica-filled rubber composition.

Results

The resulting vulcanizates of Example 6 and Comparative Examples 1 and 2 were tested for various physical properties in accordance with standard ASTM procedures.

As seen in Table 9, cure level (as indicated by S' max, S' min and T50 values) and hardness for all compounds are similar, enabling comparisons of the remaining data.

TABLE 9

| | Compound Performance Data | | |
|---|---|---|---|
| Filler | Example 6 Silica-Graphene Composite | CE-1 75 parts silica: 5 parts graphene | CE-2 80 parts silica |
| S' Max, dNm | 20.5 | 18.8 | 20.2 |
| S' Min, dNm | 6.9 | 6.4 | 9.0 |
| T50, min | 23.7 | 24.4 | 24.6 |
| Tensile, MPa | 8.3 | 4.1 | 2.6 |
| Elongation, % | 588 | 580 | 331 |
| Modulus @ 100%, MPa | 1.3 | 0.9 | 1.1 |
| Modulus @ 300%, MPa | 4.0 | 2.1 | 2.5 |
| 300/100% Modulus ratio | 3.2 | 2.2 | 2.4 |
| Hardness @ 23° C. | 63 | 60 | 65 |
| Hardness @ 100° C. | 54 | 50 | 56 |
| Rebound @ 23° C., % | 40 | 41 | 45 |
| Rebound @ 100° C., % | 53 | 48 | 53 |
| G' @ 60° C., MPa | 2.56 | 2.17 | 2.41 |
| Tan (δ) @ 60° C. | 0.184 | 0.200 | 0.174 |
| Tan (δ) @ 0° C. | 0.248 | 0.264 | 0.237 |
| G' @ 1.0%, 30° C., MPa | 4.08 | 3.12 | 3.75 |
| DIN Abrasion index | 108 | 92 | 100 |
| Die C Tear strength (N/mm) | 50 | 57 | 37 |

It can be seen in Table 9 that CE-1 (5 phr of free graphene) has higher tensile strength, elongation and tear strength than the compound without graphene (CE-2). Significant benefits are obtained when the silica-graphenic carbon composite is used (Example 6) as in this invention compared to adding the graphene directly in the mixer (CE-1). The composite-containing Example 6 shows a much higher reinforcement evidenced in several parameters such as more than doubled tensile strength, 50% higher 300% o/100% modulus ratio, higher dynamic modulus (G') and 17% higher abrasion resistance as compared to rubber where the graphene and silica were added separately (CE-1). Significant improvements are also demonstrated when compared to a standard silica-filled rubber formulation (CE-2).

The resulting vulcanizate of Example 7 was also tested for various physical properties in accordance with standard ASTM procedure.

As seen in Table 10, hardness and dynamic stiffness (G') is comparable for the graphene oxide composite (Example 7) and silica compound (CE-2).

TABLE 10

Compound Performance Data

| Filler | Example 7 Silica-Graphene Oxide Composite | CE-2 80 parts silica |
|---|---|---|
| S' Max, dNm | 29.1 | 20.2 |
| S' Min, dNm | 5.3 | 9.0 |
| T50, min | 17.4 | 24.6 |
| Tensile, MPa | 17.7 | 2.6 |
| Elongation, % | 505 | 331 |
| Modulus @ 100%, MPa | 2.6 | 1.1 |
| Modulus @ 300%, MPa | 9.6 | 2.5 |
| 300/100% Modulus ratio | 3.7 | 2.4 |
| Hardness @ 23° C. | 65 | 65 |
| Hardness @ 100° C. | 63 | 56 |
| Rebound @ 23° C., % | 50 | 45 |
| Rebound @ 100° C., % | 66 | 53 |
| G' @ 60° C., MPa | 2.45 | 2.41 |
| Tan (δ) @ 60° C. | 0.108 | 0.174 |
| Tan (δ) @ 0° C. | 0.198 | 0.237 |
| G' @ 1.0%, 30° C., MPa | 3.06 | 3.75 |
| DIN Abrasion index | 110 | 100 |
| Die C Tear strength (N/mm) | 45 | 37 |

Significant benefits are obtained when the silica-graphene oxide composite is used (Example 7) as in this invention compared to the silica control compound (CE-2). The composite-containing Example 7 shows a much higher reinforcement evidenced in several parameters such as higher tensile strength, higher elongation and higher 300%/100% modulus ratio. Also, improvements in hysteresis (Tan (6) @ 60° C.), DIN abrasion resistance and tear strength are demonstrated.

It will be readily appreciated by those skilled in the art that modifications may be made to the invention without departing from the concepts disclosed in the foregoing description. Accordingly, the particular embodiments described in detail herein are illustrative only and are not limiting to the scope of the invention which is to be given the full breadth of the appended claims and any and all equivalents thereof.

We claim:

1. Silica-graphenic carbon composite particles comprising from 60 to 99.9 weight percent silica and from 0.1 to 40 weight percent graphenic carbon, wherein the graphenic carbon is distributed throughout each composite particle, and the silica comprises multiple silica particles contacting each other in a continuous or interconnected network in which the graphenic carbon is distributed, and wherein the composite particles have an average particle size of from 2 to 100 microns.

2. The silica-graphenic carbon composite particles of claim 1, wherein the composite particles have an average particle size of from 3 to 10 microns.

3. The silica-graphenic carbon composite particles of claim 1, wherein the graphenic carbon comprises graphite oxide, graphene oxide, rGO, or combinations thereof.

4. A method of making silica-graphenic carbon composite particles, the method comprising drying a slurry comprising silica particles, graphenic carbon particles and a liquid carrier to thereby produce the silica-graphenic carbon composite particles, wherein the composite particles comprise from 60 to 99.9 weight percent silica and from 0.1 to 40 weight percent graphenic carbon, wherein the graphenic carbon is dispersed throughout each silica-graphenic carbon composite particle, and the silica comprises a continuous or interconnected network in which the graphenic carbon is dispersed, and wherein the composite particles have an average particle size of from 2 to 100 microns.

5. The method of claim 4, wherein the drying comprises spray drying.

6. The method of claim 4, wherein the liquid carrier comprises water.

7. The method of claim 4, wherein the slurry further comprises a dispersing agent.

8. An elastomeric formulation comprising:

a base elastomer composition; and from 5 to 70 weight percent silica-graphenic carbon composite particles comprising from 60 to 99.9 weight percent silica and from 0.1 to 40 weight percent graphenic carbon, wherein the graphenic carbon is distributed throughout each silica-graphenic carbon composite particle, and the silica comprises a continuous or interconnected network in which the graphenic carbon is distributed, and wherein the composite particles have an average particle size of from 2 to 100 microns.

9. The elastomeric formulation of claim 8, wherein the base elastomer composition comprises natural rubber, synthetic rubber, or combinations thereof.

10. The elastomeric formulation of claim 8, wherein the base elastomer composition comprises styrene/butadiene rubber, butadiene rubber, butyl rubber, EPDM rubber, nitrile rubber, chloroprene rubber, silicone rubber, fluoroelastomer rubber, natural rubber, and/or functionalized derivatives thereof.

11. The elastomeric formulation of claim 8, wherein the elastomeric formulation is a tire tread formulation.

12. The elastomeric formulation of claim 8, wherein the base elastomer composition comprises at least one additive selected from processing oils, antioxidants, curatives, or metal oxides.

13. The elastomeric formulation of claim 8, wherein the composite particles are present in the elastomeric formulation in an amount of from 30 to 50 weight percent.

14. A method of making an elastomeric formulation comprising: mixing silica-graphenic carbon composite particles with a base elastomer composition to form a mixture; and curing the mixture, wherein the composite particles comprise from 60 to 99.9 weight percent silica and from 0.1 to 40 weight percent graphenic carbon, wherein the graphenic carbon is distributed throughout each silica-graphenic carbon composite particle, and the silica comprises a continuous or interconnected network in which the graphenic carbon is distributed, and wherein the composite particles have an average particle size of from 2 to 100 microns.

15. The method of claim 14, wherein the base elastomer composition comprises natural rubber, synthetic rubber, or combinations thereof.

16. The method of claim 14, wherein the base elastomer composition comprises styrene/butadiene rubber, butadiene rubber, butyl rubber, EPDM rubber, nitrile rubber, chloroprene rubber, silicone rubber, fluoroelastomer rubber, natural rubber, and/or functionalized derivatives thereof.

17. The method of claim 14, wherein the elastomeric formulation is a tire tread formulation.

18. The method of claim 14, wherein the base elastomer composition comprises at least one additive selected from processing oils, antioxidants, curatives, or metal oxides.

19. The method of claim 14, wherein the composite particles are present in the elastomeric formulation in an amount of from 30 to 50 weight percent.

\* \* \* \* \*